(12) United States Patent
Takeda et al.

(10) Patent No.: US 7,416,348 B2
(45) Date of Patent: Aug. 26, 2008

(54) OPTICAL CONNECTOR EXCELLENT IN ASSEMBLABILITY AND DIMENSIONAL ACCURACY

(75) Inventors: Jun Takeda, Tokyo (JP); Yuichi Koreeda, Tokyo (JP)

(73) Assignee: Japan Aviation Electronics Industry, Limited, Tokyo (JP)

(*) Notice: Subject to any disclaimer, the term of this patent is extended or adjusted under 35 U.S.C. 154(b) by 225 days.

(21) Appl. No.: 11/354,780

(22) Filed: Feb. 15, 2006

(65) Prior Publication Data

US 2006/0182396 A1 Aug. 17, 2006

(30) Foreign Application Priority Data

Feb. 15, 2005 (JP) ............................. 2005-038154

(51) Int. Cl.
*G02B 6/38* (2006.01)

(52) U.S. Cl. ............................... 385/60; 385/72; 385/78

(58) Field of Classification Search .............. 385/53–87
See application file for complete search history.

(56) References Cited

U.S. PATENT DOCUMENTS 5,123,071 A * 6/1992 Mulholland et al. ........... 385/53

FOREIGN PATENT DOCUMENTS

| JP | 05-323149 | 12/1993 |
|---|---|---|
| JP | 05323149 A * | 12/1993 |
| JP | 3062930 | 12/1997 |
| JP | 3483889 | 9/1998 |
| JP | 10-319273 | 12/1998 |
| JP | 10319273 A * | 12/1998 |
| WO | WO 95/35520 | 12/1995 |

* cited by examiner

*Primary Examiner*—M. R. Connelly-Cushwa
(74) *Attorney, Agent, or Firm*—Collard & Roe, P.C.

(57) ABSTRACT

In an optical connector for use in connecting an optical fiber, a housing defines an optical axis extending in a predetermined direction. For positioning the optical fiber along the optical axis, a ferrule is accommodated in the housing to be movable in the predetermined direction. The housing further accommodates a fixing member engaged with the housing in the predetermined direction. Between the ferrule and the fixing member, an elastic member is interposed to urge the ferrule towards one side in the predetermined direction. In addition, the housing has a guide groove extending in the predetermined direction. The fixing member has a guide portion protruding through the guide groove to the outside of the housing.

18 Claims, 5 Drawing Sheets

OPTICAL CONNECTOR EXCELLENT IN ASSEMBLABILITY AND DIMENSIONAL ACCURACY

This application claims priority to prior Japanese patent application JP 2005-38154, the disclosure of which is incorporated herein by reference.

BACKGROUND OF THE INVENTION

This invention relates to an optical connector for use in connecting an optical fiber.

In recent years, an optical connector is requested to be reduced in size, i.e., to be reduced in overall length. Furthermore, since an available work space for assembling the optical connector is limited in an axial direction of the optical connector, a simple assembling structure is requested.

As an existing optical connector, there is known a cylindrical optical connector comprising a plug and a receptacle. The plug comprises a ferrule for holding an optical fiber, an insulating front housing accommodating a ferrule, an insulating rear housing opposite to the front housing in an axial direction, a spring interposed between the rear housing and the ferrule, and an outer shell to be engaged with the receptacle (for example, see Japanese Patent (JP-B) No. 3062930).

In the above-mentioned optical connector, the spring must be accommodated in the front and the rear housings together with the ferrule. However, accommodation of the ferrule and the spring can not be completed only by the front and the rear housings and an assembling structure is inevitably complicated. Further, assembling of the optical connector requires complicated operations. Specifically, it is necessary to insert the front housing into the shell, to accommodate the ferrule in the front housing, and to fit a bottom plate to the shell while pushing the rear housing forward against a reaction force of the spring.

Another optical connector is disclosed in Japanese Patent (JP-B) No. 3483889 (WO95/035520). The optical connector comprises a ferrule, an attachment body for receiving the ferrule, a tubular crimp ring connected to an axial one end of the attachment body, a tubular cable boot fitted over the crimp ring, and a plug body fitted to an axial other end of the attachment body.

However, in each of the above-mentioned optical connectors, the number of components is large so that a dimensional error of an overall length of the optical connector is inevitably increased. This results in a disadvantage that the optical connector is not stable in performance.

SUMMARY OF THE INVENTION

It is therefore an object of this invention to provide an optical connector which can easily be assembled.

It is another object of this invention to provide an optical connector which can be reduced in dimensional error in an axial direction.

Other objects of the present invention will become clear as the description proceeds.

According to an aspect of the present invention, there is provided an optical connector for use in connecting an optical fiber, the optical connector comprising a housing defining an optical axis extending in a predetermined direction, a ferrule accommodated in the housing and movable in the predetermined direction, the ferrule being for positioning the optical fiber along the optical axis, a fixing member accommodated in the housing and engaged with the housing in the predetermined direction, and an elastic member interposed between the ferrule and the fixing member to urge the ferrule towards one side in the predetermined direction, the housing having a guide groove extending in the predetermined direction, the fixing member having a guide portion protruding through the guide groove to the outside of the housing.

According to another aspect of the present invention, there is provided an optical connector for connecting an optical fiber with a mating object, the optical connector comprising a housing, a ferrule for receiving the optical fiber inserted therethrough, an elastic member for continuously urging the ferrule towards the mating object, and a fixing member for fixing the ferrule to the housing through the elastic member, the housing having a receiving portion for receiving the fixing member, the receiving portion having an engaging portion to be engaged with the fixing member and a pair of guide grooves for guiding insertion of the fixing member, the fixing member having a locking portion to be engaged with the engaging portion when the fixing member is received in the receiving portion, and a pair of guide portions protruding outward from the guide grooves.

DESCRIPTION OF THE PREFERRED EMBODIMENTS

Figure 1:
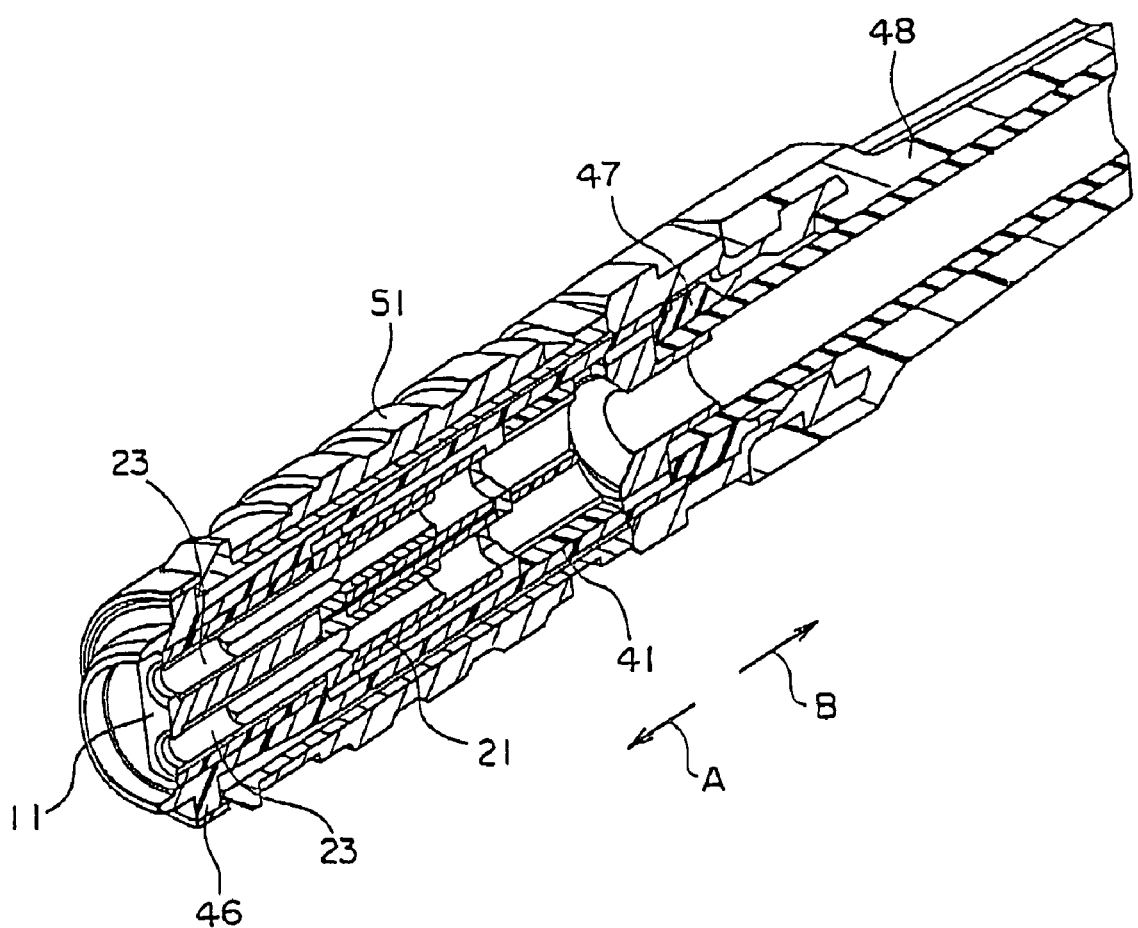
FIG. 1 is a vertically-sectional schematic perspective view showing an optical connector according to an embodiment of this invention.
Figure 2:
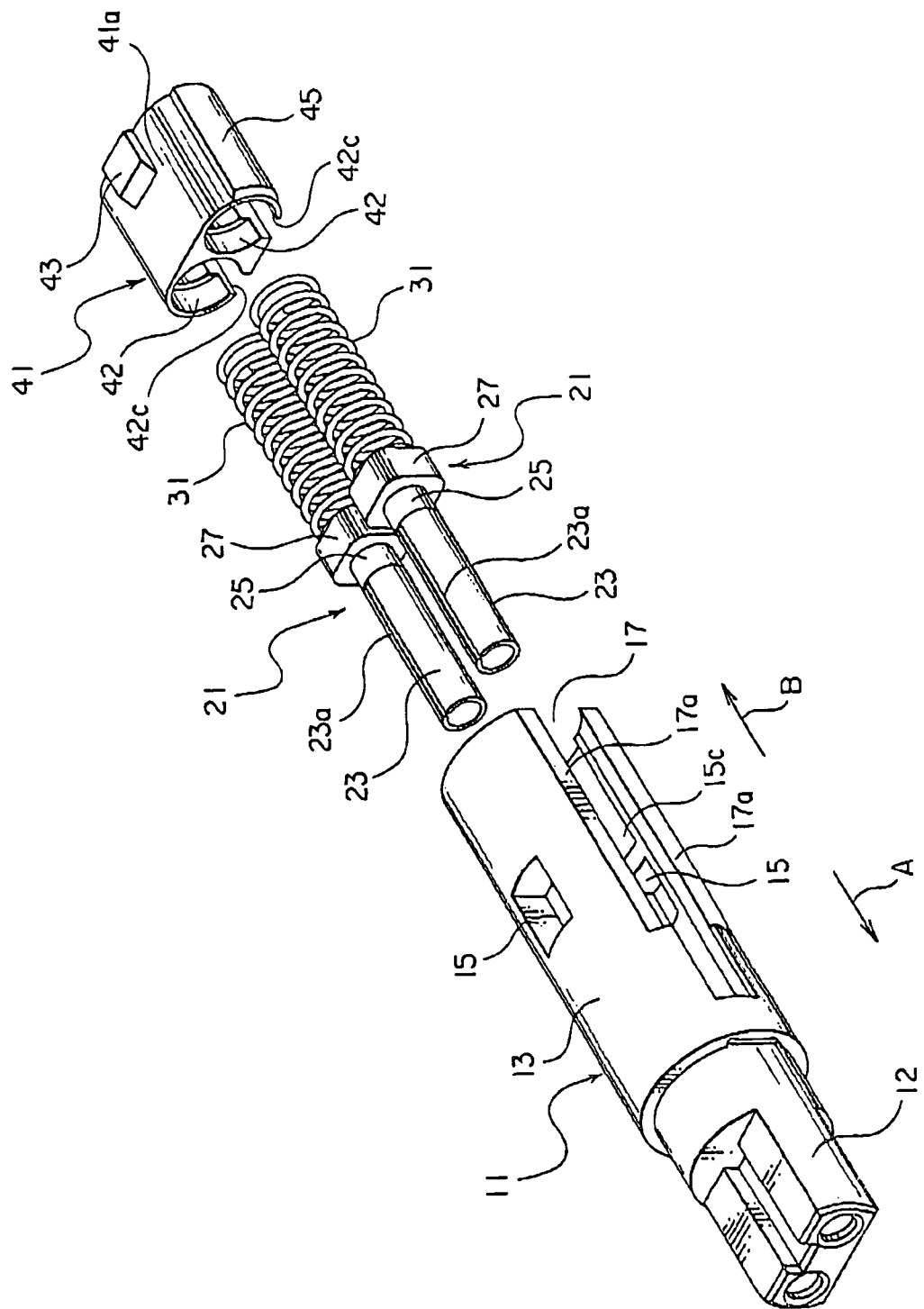
FIG. 2 is an exploded perspective view of an internal structure of the optical connector in FIG. 1 from which an outer shell is removed.

Referring to FIGS. 1 and 2, description will be made of a structure of an optical connector according to an embodiment of this invention. In comparison with FIG. 1, FIG. 2 shows the optical connector at a position rotated by 90° around a center axis of the optical connector.

The optical connector illustrated in the figure is for connecting two optical fibers to another two optical fibers in one-to-one correspondence and is called a two-fiber optical connector plug. Generally, the two-fiber optical connector plug can be fitted, with movement thereof towards a first or coupling direction A, to a two-fiber optical connector receptacle connected to another two optical fibers.

The optical connector comprises a housing (front housing) 11 of a plastic material defining two optical axes extending in a predetermined direction, two ferrules (hereinafter called "plug-side ferrules") 21 for receiving two optical fibers (not shown) inserted therethrough, respectively, two elastic members 31 for continuously urging the plug-side ferrules 21 towards a mating object (a two-fiber optical connector receptacle) and a fixing member (rear housing) 41 for fixing the plug-side ferrules 21 to the housing 11 via the elastic members 31. The housing 11, the plug-side ferrules 21, the elastic members 31, and the fixing member 41 are disposed in a shell member 51 of a plastic or a metal material and of a generally cylindrical shape illustrated in FIG. 1.

The housing 11 comprises a fitting portion 12 for accommodating or receiving two ferrules (hereinafter called "mating ferrules") of the mating object and a generally tubular receiving portion 13 for receiving the plug-side ferrules 21, the elastic members 31, and the fixing member 41. The receiving portion 13 extends from the fitting portion 12 in a second or separating direction B opposite to the first direction A. The receiving portion 13 is provided with a pair of engaging portions 15 to be engaged with the fixing member 41 and a pair of guide grooves 17 for guiding insertion of the fixing member 41.

Each of the engaging portions 15 has an opening formed at an intermediate portion of the receiving portion 13 in the first and the second directions A and B and at a part of a circumferential surface of the receiving portion 13 to penetrate the receiving portion 13 from the inside to the outside. Each of the guide grooves 17 is formed by cutting the receiving portion 13 from an end of the receiving portion 13 in the second direction B and extends in the first direction A. The receiving portion 13 has flat surfaces 17a parallel to each other and formed on circumferential opposite sides of each of the guide grooves 17. Each of he flat surfaces 17a are formed by cutting a part of the receiving portion 13 along a plane perpendicular to a radial direction.

Each of the plug-side ferrules 21 comprises a sleeve 23 to be positioned with respect to the mating ferrule (not shown), a collar 25 for positioning the sleeve 23 at an appropriate position, and a flange portion 27 fixing the collar 25. The sleeve 23 is provided with a slotted portion 23a extending between opposite ends thereof in the first and the second directions A and B and at a part thereof in a circumferential direction. Therefore, the sleeve 23 is slightly deformable in the radial direction. The plug-side ferrule 21 has a ferrule element 28 disposed inside the sleeve 23 to accurately position the optical fiber along the optical axis.

Figure 2A:
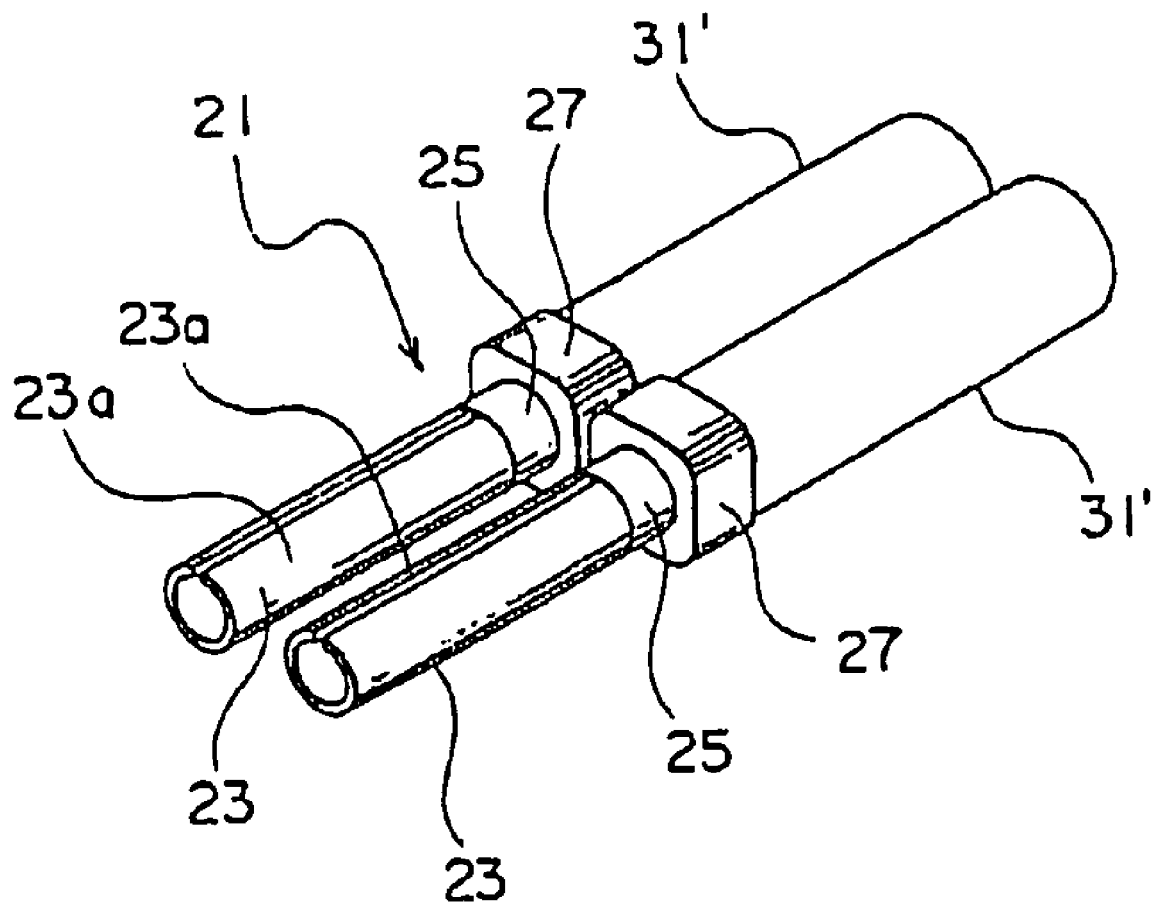
FIG. 2A is a perspective view showing a modification of a ferrule contained in the internal structure in FIG. 1.

One end of the elastic member 31 is fixed to the flange portion 27 on the side opposite to the collar 25. The elastic member 31 is a coil spring in FIG. 2 but may be a tubular rubber member 31' as shown in FIG. 2A.

The fixing member 41 has two insert holes 42 allowing the elastic members 31 to pass therethrough, a locking portion 43 in the form of a protrusion formed on an upper surface portion 41a connecting the insert holes 42 to each other, and a pair of guide portions 45 formed on opposite sides of the upper surface portion 41a to protrude outward. Further, the fixing member 41 has another locking portion similar to the locking portion 43 and formed on the other side opposite to the upper surface portion 41a, and a pair of slotted portions 42c as slotted openings communicating with the insert holes 42, respectively.

The locking portion 43 is a portion to be engaged with the engaging portion 15 of the housing 11. Each of the guide portions 45 has an arcuate shape substantially concentric with an inner surface of the insert hole 42 and is a portion to be inserted into and guided by the guide groove 17 of the receiving portion 13 of the housing 11. A reference numeral 46 represents a barrel of a plastic material, 47, a boot of a plastic or a rubber material, 48, a bushing of a rubber material.

When the fixing member 41 is received in the receiving portion 13 of the housing 11 the guide portion 45 passes through the guide groove 17 to protrude outward from the flat surfaces 17a of the receiving portion 13. The engaging portion 15 formed on the receiving portion 13 of the housing 11 is engaged with the locking portion 43 formed at a corresponding position of the fixing member 41.

Figure 3:
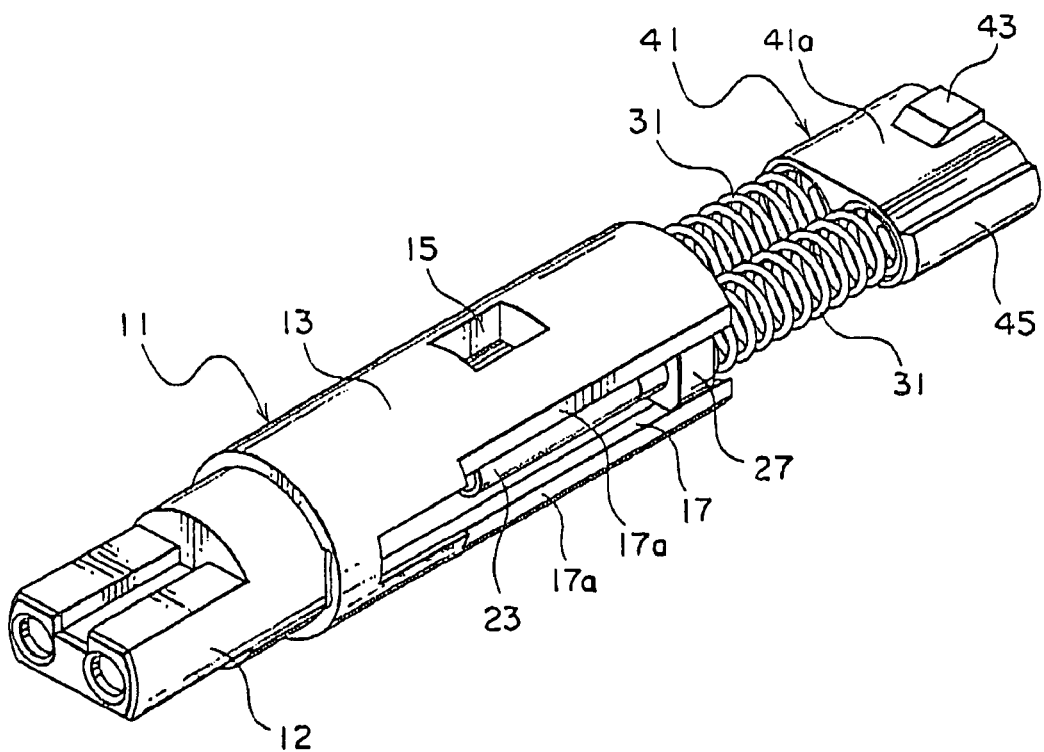
FIG. 3 is a perspective view showing the internal structure illustrated in FIG. 2 in a half-assembled state.
Figure 4:
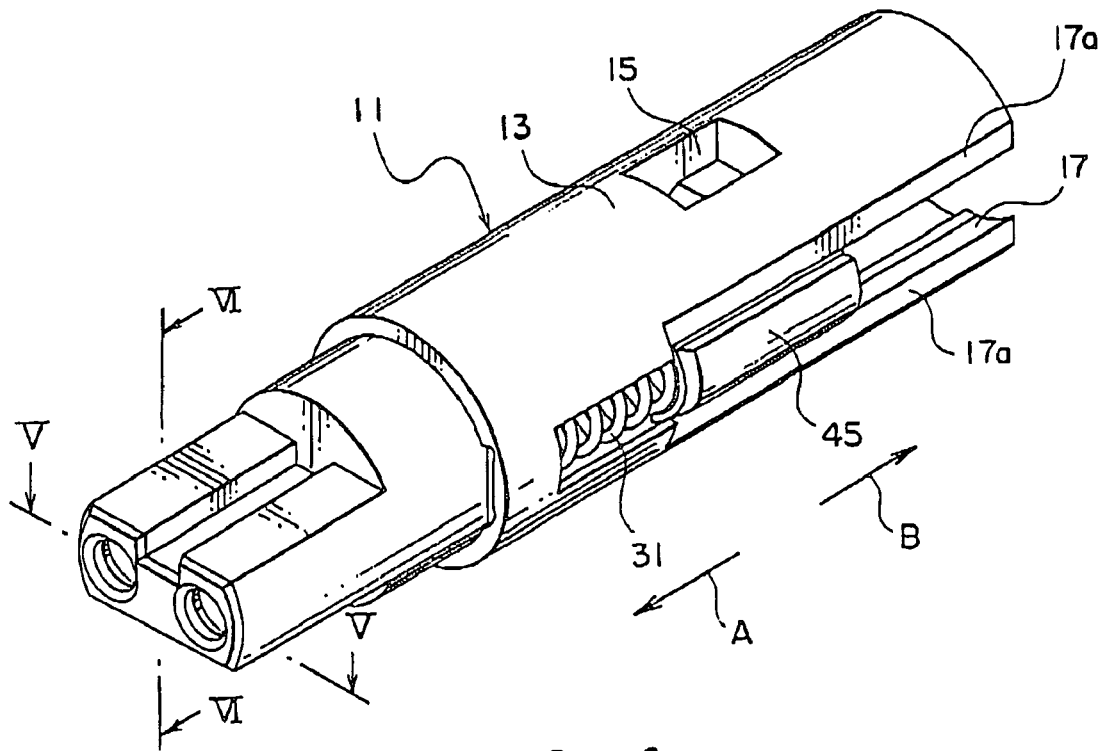
FIG. 4 is a perspective view showing the internal structure illustrated in FIGS. 2 and 3 in an assembled state.

Next, referring to FIGS. 3 and 4 in addition, description will be made of assembling of the above-mentioned optical connector.

The optical fibers are preliminarily inserted through the sleeves 23, the collars 25, and the elastic members 31 of the plug-side ferrules 21 and through the insert holes 42 of the fixing member 41. Since the fixing member 41 is provided with the slotted portions 42c, the optical fibers can easily be inserted through the insert holes 42 via the slotted portions 42c even after the optical fibers are coupled to the plug-side ferrules 21.

As illustrated in FIG. 2, the fixing member 41 is disposed behind the elastic members 31. As illustrated in FIG. 3, the housing 11 is moved in the second direction B. At this time, the guide portions 45 of the fixing member 41 are inserted into and guided by the guide grooves 17 of the housing 11. Since the guide portions 45 protrude outward from the flat surfaces 17a, the optical connector can be assembled as illustrated in FIG. 4 by holding and moving the guide portions 45 by an operator's hand without using a tool.

Further, the shell member 51 is fitted over of the housing 11. In this respect, each of the guide portions 45 of the fixing member 41 is designed to have a dimension corresponding to an inner diameter of the shell member 51. Only by the housing 11 and the fixing member 41, accommodation of the plug-side ferrules 21 is completed. Thus, the shell portion 51 can easily be coupled.

Figure 5:
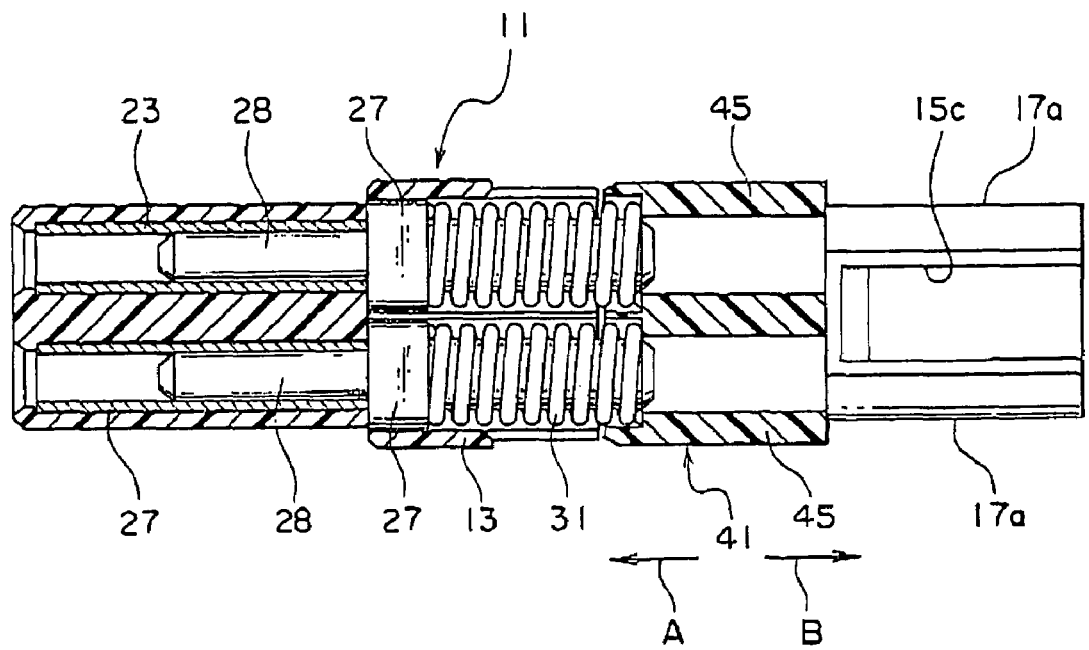
FIG. 5 is a sectional view taken along a line V-V in FIG. 5.
Figure 6:
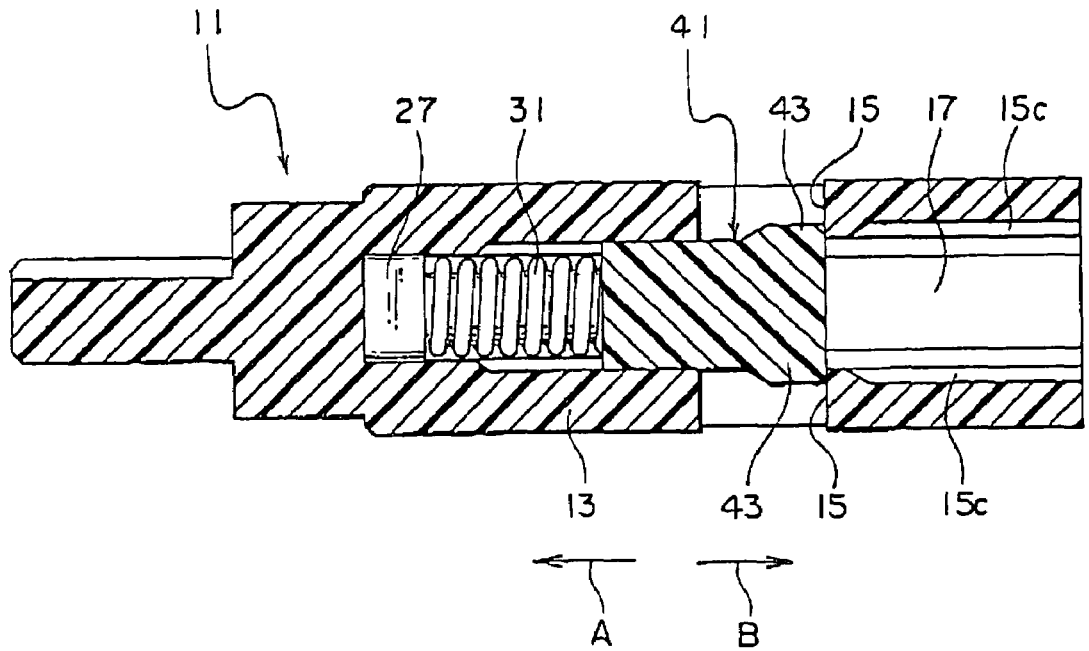
FIG. 6 is a sectional view taken along a line VI-VI in FIG. 4.

Referring to FIGS. 5 and 6, accommodation of the fixing member 41 and the plug-side ferrules 21 in the housing 11 is completed. The receiving portion 13 of the housing 11 is provided with a pair of locking guide grooves 15c formed on an inner surface thereof to guide the locking portions 43 of the fixing member 41 from an end face of the receiving portion 13 in the second direction B towards the engaging portion 15. When the fixing member 41 is inserted into the receiving portion 13 of the housing 11, the locking portions 43 of the fixing member 41 are guided by the locking guide grooves 15c and moved to be engaged with the engaging portions 15.

The receiving portion 13 is split by the guide grooves 17 to form two cantilevered portions extending in the second direction B. Therefore, even if the fixing member 41 and the receiving portion 13 of the housing 11 are slightly inclined so that their center axes intersect with each other, the guide grooves 17 are expanded to absorb such inclination.

As shown in FIGS. 5 and 6, the fixing member 41 is accommodated in the housing 11. Therefore, the fixing member 41 is not involved in a dimensional error in the first and the second directions A and B.

Although this invention has been described in conjunction with the preferred embodiment thereof, this invention may be modified in various other manners within the scope of the appended claims. The description has been made about the two-fiber optical connector plug. However, this invention may be implemented as a connector for connecting a single optical fiber or three or more optical fibers.

What is claimed is:

1. An optical connector for use in connecting an optical fiber, the optical connector comprising:
   a housing defining an optical axis extending in a predetermined direction;
   a ferrule accommodated in the housing and movable in the predetermined direction, the ferrule being for positioning the optical fiber along the optical axis;
   a fixing member accommodated in the housing and engaged with the housing in the predetermined direction;

the fixing member having an insert hole penetrating therethrough in the predetermined direction and adapted to receive the optical fiber; and a slotted portion communicating with the insert hole in a radial direction and extending in the predetermined direction; and an elastic member interposed between the ferrule and the fixing member to urge the ferrule towards one side in the predetermined direction, the housing having a guide groove extending in the predetermined direction, the fixing member having a guide portion protruding through the guide groove to the outside of the housing.

2. The optical connector according to claim 1, wherein the housing has a receiving portion defining the guide groove and accommodating the fixing member.

3. The optical connector according to claim 2, wherein the receiving portion has an outer circumferential surface which comprises:

a flat surface adjacent to the guide groove in a circumferential direction; and a substantially cylindrical surface continuous from the flat surface, the guide portion protruding outward from the flat surface.

4. The optical connector according to claim 3, wherein the guide portion has an arcuate surface disposed outside the receiving portion and substantially concentric with the cylindrical surface.

5. The optical connector according to claim 2, wherein the receiving portion has an engaging portion, the fixing member having a locking portion engaged with the engaging portion in the predetermined direction.

6. The optical connector according to claim 5, wherein the engaging portion is a through hole formed on the receiving portion, the locking portion being a protrusion disposed in the through hole.

7. The optical connector according to claim 2, wherein the receiving portion has a substantially cylindrical outer circumferential surface and defines an additional groove formed at a position different from that of the guide groove in a circumferential direction and extending in the predetermined direction, the guide groove and the additional groove being opened on the other side of the receiving portion in the predetermined direction so that the receiving portion has a pair of cantilevered portions deformable in a radial direction.

8. The optical connector according to claim 7, wherein the fixing member has an additional guide portion protruding through the additional groove to the outside of the receiving portion.

9. The optical connector according to claim 8, wherein the receiving portion has an outer circumferential surface which comprises:

an additional flat surface adjacent to the additional groove in the circumferential direction; and a substantially cylindrical surface continuous from the additional flat surface, the additional guide portion protruding outward from the additional flat surface.

10. The optical connector according to claim 9, wherein the additional guide portion has an arcuate surface disposed outside the receiving portion and substantially concentric with the cylindrical surface.

11. The optical connector according to claim 7, wherein the receiving portion has engaging portions formed on the cantilevered portions, respectively, the fixing member having locking portions engaged with the engaging portions in the predetermined direction, respectively.

12. The optical connector according to claim 1, further comprising a shell member covering an outer circumferential surface of the housing.

13. The optical connector according to claim 12, wherein the guide portion is designed to have a dimension corresponding to an inner diameter of the shell member.

14. The optical connector according to claim 1, wherein the elastic member is has a coil-like shape.

15. The optical connector according to claim 1, wherein the elastic member has a cylindrical shape.

16. An optical connector according to claim 1, wherein
the housing comprises a receiving portion for receiving the fixing member,
the receiving portion having:
an engaging portion to be engaged with the fixing member; and
a pair of guide grooves for guiding insertion of the fixing member.

17. The optical connector according to claim 16, wherein the guide groove is a portion formed by cutting the receiving portion of a cylindrical shape, the guide groove being provided with a pair of flat surfaces parallel to each other and formed by cutting the receiving portion in a direction perpendicular to a radial direction.

18. An optical connector according to claim 1, wherein the fixing member further comprises:
a locking portion to be engaged with the engaging portion when the fixing member is received in the receiving portion; and
a pair of guide portions protruding outward from the guide grooves.

* * * * *